US012737735B2

(12) United States Patent
Penniman et al.

(10) Patent No.: US 12,737,735 B2
(45) Date of Patent: Sep. 15, 2026

(54) MIXED TECHNIQUE TRANSACTION CLASSIFICATION

(71) Applicant: Self Financial, Inc., Austin, TX (US)

(72) Inventors: Cary Penniman, Austin, TX (US); Massoud Masir, Austin, TX (US); Qiaochu Tang, Austin, TX (US); Hani AbuGhazaleh, Austin, TX (US); Danut Prisacaru, Austin, TX (US); Drew Bullard, Austin, TX (US); Kelvin Pho, Austin, TX (US)

(73) Assignee: Self Financial, Inc., Austin, TX (US)

( * ) Notice: Subject to any disclaimer, the term of this patent is extended or adjusted under 35 U.S.C. 154(b) by 170 days.

(21) Appl. No.: 18/497,554

(22) Filed: Oct. 30, 2023

(65) Prior Publication Data

US 2025/0139594 A1 May 1, 2025

(51) Int. Cl.
*G06Q 20/02* (2012.01)
*G06N 20/00* (2019.01)

(52) U.S. Cl.
CPC ............. *G06Q 20/02* (2013.01); *G06N 20/00* (2019.01)

(58) Field of Classification Search
CPC ................. G06Q 20/00–425; G06N 20/00–20
See application file for complete search history.

(56) References Cited

U.S. PATENT DOCUMENTS

| | | | | |
|---|---|---|---|---|
| 8,504,470 | B1 | 8/2013 | Chirehdast | |
| 11,113,759 | B1 | 9/2021 | Kapczynski et al. | |
| 11,537,845 | B2 * | 12/2022 | Sevrens | G06N 3/0442 |
| 2013/0226779 | A1 | 8/2013 | Haggerty et al. | |
| 2020/0074100 | A1 * | 3/2020 | Raneri | G06F 16/248 |
| 2022/0122171 | A1 * | 4/2022 | Hubard | G06Q 40/03 |
| 2024/0144050 | A1 * | 5/2024 | Wang | G06N 3/08 |

OTHER PUBLICATIONS

Liu, Shilei & Zhao, Xiaofeng & Li, Bochao & Ren, Feiliang. (2021). Knowledge-Grounded Dialogue with Reward-Driven Knowledge Selection. Available at: https://arxiv.org/abs/2108.13686 (Year: 2021).*

* cited by examiner

*Primary Examiner* — Mohammad A. Nilforoush
(74) *Attorney, Agent, or Firm* — Fish & Richardson P.C.

(57) ABSTRACT

This disclosure describes a system and method for classifying transactions including receiving a plurality of transactions associated with a user, vectorizing the plurality of transactions, and providing the vectorized transactions to a machine learning model trained to identify one or more reportable transaction to one or more third party servers. The machine learning model includes one or more sub-models. The output of the machine learning model is obtained and represents a subset of the vectorized plurality of transactions that are reportable transactions. A recommendation is generated based on the reportable transactions. Data is provided to a user device to be rendered by the user device which will display the recommendation. Upon receiving an instruction from the user device, the particular reportable transaction is reported to a third-party server.

20 Claims, 5 Drawing Sheets

MIXED TECHNIQUE TRANSACTION CLASSIFICATION

BACKGROUND

Digital banking has become a commonplace means of managing individual wealth. As a result, credit reporting agencies rely on a multitude of factors to assess risk associated with different users. In order to provide an accurate representation of a user's risk, certain qualifying transactions can be reported to the agencies.

SUMMARY

The present disclosure involves system, software, and computer implemented methods for classifying transactions including receiving a plurality of transactions associated with a user, vectorizing the plurality of transactions, and providing the vectorized transactions to a machine learning model trained to identify one or more reportable transactions to one or more third party servers. The machine learning model includes one or more sub-models. The output of the machine learning model is obtained and represents a subset of the vectorized plurality of transactions that are reportable transactions. A recommendation is generated based on the reportable transactions. Data is provided to a user device to be rendered by the user device which will display the recommendation. Upon receiving an instruction from the user device, the particular reportable transaction is reported to a third-party server.

Implementations can optionally include one or more of the following features.

In some instances, the machine learning model includes a first machine learning sub-model trained to generate a subset of transactions that are classified as candidate reportable transactions, a second machine learning sub-model is trained to classify each candidate reportable transaction as a particular transaction type, a third machine learning sub-model is trained to identify a receiving party associated with at least one of the candidate reportable transactions and a fourth machine learning sub-model is configured to receive outputs of the second and third machine learning sub-models and determine whether each candidate reportable transaction is a reportable transaction.

In some instances, a subset of the reportable transactions is selected and sent for verification to confirm classification outputs from at least one of the second, third, or fourth machine learning sub-models. One or more inputs are received that indicate verification results associated with particular ones of the reportable transactions included within the subset. The classification outputs can be updated based on the one or more inputs and labeled model training data can be generated from the one or more inputs.

In some instances, the plurality of transactions includes automated clearing house (ACH) transactions associated with a checking account of the user.

In some instances, the reportable transactions are utility transactions.

In some instances, the particular transaction type is one of a gas, water electricity, wireless, or internet type.

In some instances, the first, second, third, and fourth machine learning sub-models include extreme gradient boosting (XGboost) models.

In some instances, the plurality of transactions is vectorized by performing a bidirectional auto-regressive transformer (BART) tokenization and term frequency-inverse document frequency (TF-IDF) vectorization.

In some instances, the reportable transactions are provided to a fifth machine learning model trained to predict a change in credit score of the user based on the reportable transactions. The fifth machine learning model can provide a predicted change in the credit score of the user based on the reportable transactions and a recommendation can be sent to the user of whether to report the reportable transaction based on the predicted change in credit score of the user.

The discussed solution provides technical advantages. For example, providing automatic analysis of a user account enables more accurate identification of reportable transactions that may go unnoticed by a user manually reviewing. Further, the discussed machine learning models can identify and classify transactions that would not be recognizable to a user, because the machine learning model can have access to a large corpus (e.g., billions) of transactions that have been previously analyzed. Additionally, the analysis can be provided at a backend system and presented using a relatively low complexity user computing device. This enables advanced functionality with the convenience and portability of a user mobile device.

The details of these and other aspects and embodiments of the present disclosure are set forth in the accompanying drawings and the description below. Other features, objects, and advantages of the disclosure will be apparent from the description, drawings, and claims.

DESCRIPTION OF DRAWINGS

Some example embodiments of the present disclosure are illustrated by way of example and not limitation in the figures of the accompanying drawings, in which like reference numbers indicate similar elements.

DETAILED DESCRIPTION

This disclosure describes methods, software, and systems for automatically determining whether transactions are reportable to one or more credit reporting agencies (reporting agencies) with sparse information. Further methods, software, and systems can include reporting such transactions automatically, and predicting a resultant change in associated risk assessment done by the reporting agencies.

In general, reporting agencies or credit bureaus (e.g., Equifax, Experian, and TransUnion) track transactions for millions of users, and assign each user a "credit score" based on a number of parameters. These parameters can include historic spending patterns, total debt, payment history, and other key metrics. However, while many payments, such as credit card transactions, are automatically reported to credit bureaus, some reportable payments are not typically reported unless the account owner reports them manually. As a result, many users have more payment history than the reporting agencies are aware of, and as a result, may have a lower credit score than they might if the reporting agencies accounted for such additional payment history.

Utility, cable bills, wireless/phone bills, and rent, which are often paid out of a checking account using automated clearing house (ACH) transactions are reportable, but difficult to identify because ACH transactions do not contain as much information as credit transactions, and often use obscure or cryptic transaction codes and identifiers. For example, to complete an ACH transaction, all that is required is a name, address, routing number, and account number. This can make identifying reportable payments such as utility bills difficult to identify. By using a multi-pronged approach, a system can identify reportable transactions in a user's account automatically, and prompt them for permission to report the transaction to the appropriate reporting agency. This classification can occur as an initial setup, e.g., when a new customer joins and uploads their transactions into the system, or on a continued, automated basis. Additionally, this classification can be done in a historical manner (e.g., over the past two years of transactions) to retroactively label and identify certain transactions.

Figure 1:
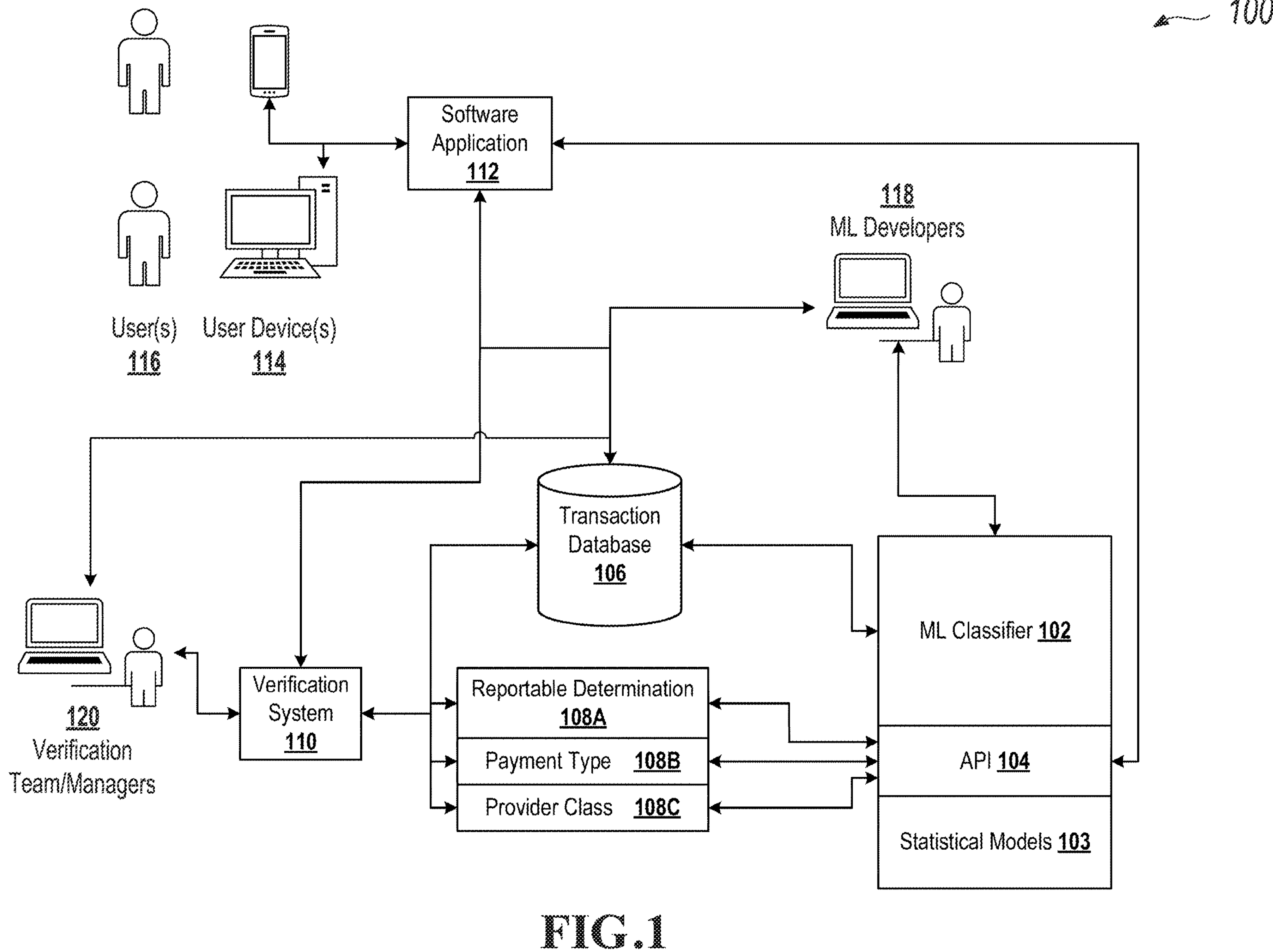
FIG. 1 is an example network diagram illustrating a system for classifying transactions or data exchanges.

FIG. 1 is an example network diagram illustrating a system for classifying transactions or data exchanges 100. FIG. 1 includes a machine learning classifier 102 and statistical models 103, which can be accessed using one or more application programming interfaces (APIs) 104. These components access and store data in a transaction database 106 in order to perform classification operations such as reportable transaction identification (108A), utility transaction type (108B), and utility provider (108C). A verification system 110 can ensure accurate results and is operated by a verification team and verification managers 120. Machine learning developers 118 interact with and improve the machine learning classifier 102 and statistical models 103. User(s) 116 interacting with user device(s) 114 can access API 104 using a software application 112 in order to utilize the transaction classification system 100.

Users 116 can be customers or prospective customers who have subscribed or otherwise registered with the system 100 using software application 112. In some implementations, the users 116 provide access to their banking account transactions which can be supplied to transaction database 106. User devices 114 can be, but are not limited to, cell phones, personal computers, tablets, terminals/consoles, or other suitable devices for executing software application 112 and interacting with system 100. In some implementations, user devices 114 provide one or more graphical user interfaces (GUIs) in order to present information and receive inputs from users 116 to software application 112.

Software application 112 can be a locally executed application, or a remotely executing application. For example, the software application 112 can be an app that is downloaded or installed on user devices 114, or it can be a web-based application, accessed using a web browser on user devices 114. In general, software application 112 interacts with API 104 in order to access machine learning classifiers 102 and statistical models 103 in order to receive recommendations on reportable transactions and/or classifications of transactions.

API 104 generally provides a communications interface between the ML classifier 102 and statistical models 103 and other systems such as the verification system 110 and the software application 112.

Machine learning classifier 102 can be a neural network or other machine learning algorithm configured to analyze a plurality of transactions and identify transactions that are reportable to one or more reporting agencies. The machine learning classifier 102 receives the transaction information and account information from a number of users 116 and generates a quantified output. For example, the machine learning classifier 102 can compare the transactions from a user's checking, savings, and credit accounts across various platforms or banks, as well as historical transactions across multiple users and classify each particular transaction as utility or non-utility, a utility type (e.g. gas, electricity, water, etc.), and who the provider for the utility is. In some implementations, the machine learning classifier 102 can identify, and in some conditions report reportable ACH transactions that are typically not automatically reported.

In some implementations, the machine learning classifier 102 is a deep learning model that employs multiple layers of models to generate an output for a received input. A deep neural network is a deep machine learning model that includes an output layer and one or more hidden layers that each apply a non-linear transformation to a received input to generate an output. In some cases, the neural network may be a recurrent neural network. A recurrent neural network is a neural network that receives an input sequence and generates an output sequence from the input sequence. In particular, a recurrent neural network uses some or all of the internal state of the network after processing a previous input in the input sequence to generate an output from the current input in the input sequence. In some other implementations, the machine learning classifier 102 is a convolutional neural network, or a transformer network. In some implementations, the machine learning classifier 102 is an ensemble of models that may include all or a subset of the architectures described above.

In some implementations, the machine learning classifier 102 can be a feedforward auto-encoder neural network. For example, the machine learning classifier 102 can be a three-layer auto-encoder neural network. The machine learning classifier 102 may include an input layer, a hidden layer, and an output layer. In some implementations, the neural network has no recurrent connections between layers. Each layer of the neural network may be fully connected to the next, e.g., there may be no pruning between the layers. The neural network may include an optimizer for training the network and computing updated layer weights, such as, but not limited to, ADAM, Adagrad, Adadelta, RMSprop, Stochastic Gradient Descent (SGD), or SGD with momentum. In some implementations, the neural network may apply a mathematical transformation, e.g., a convolutional transformation or factor analysis to input data prior to feeding the input data to the network.

In some implementations, the machine learning classifier 102 is a bidirectional encoder representation from transformers (BERT) model. BERT models apply bidirectional training to an attention model or transformer model which can yield better results in some circumstances.

In some implementations, the machine learning classifier 102 uses a vectorization process then an extreme gradient boost (XGboost) algorithm to efficiently develop classifications for large datasets. This process is particularly advantageous where compute resources are limited and the machine learning classifier 102 has access to large datasets.

In some implementations, the machine learning classifier 102 includes a series of several different machine learning models, each executing on all or a portion of the received input data.

In some implementations, the machine learning classifier 102 can be a supervised model. For example, for each input provided to the model during training, the machine learning classifier 102 can be instructed as to what the correct output should be. The machine learning classifier 102 can use batch training, e.g., training on a subset of examples before each adjustment, instead of the entire available set of examples. This may improve the efficiency of training the model and may improve the generalizability of the model. The machine learning classifier 102 may use folded cross-validation. For example, some fraction (the "fold") of the data available for training can be left out of training and used in a later testing phase to confirm how well the model generalizes. In some implementations, the machine learning classifier 102 may be an unsupervised model. For example, the model may adjust itself based on mathematical distances between examples rather than based on feedback on its performance.

The machine learning classifier 102 can be, for example, a deep-learning neural network or a "very" deep learning neural network. For example, the machine learning classifier 102 can be a convolutional neural network. The machine learning classifier 102 can be a recurrent network. The machine learning classifier 102 can have residual connections or dense connections. The machine learning classifier 102 can be an ensemble of all or a subset of these architectures. The machine learning classifier 102 is trained to quantify several parameters associated with transactions from different accounts in varying formats and structures. The model may be trained in a supervised or unsupervised manner. In some examples, the model may be trained in an adversarial manner. In some examples, the model may be trained using multiple objectives, loss functions or tasks.

The machine learning classifier 102 can be configured to provide a binary output, e.g., a yes or no indication of whether a particular transaction is reportable. In some examples, the machine learning classifier 102 is configured to determine a type of transaction, or one or more recipients of the transaction. In some implementations, the machine learning classifier 102 includes three separate algorithms. A first algorithm can classify each transaction as either reportable or non-reportable (108A). Each classification that is classified as utility can then be further analyzed and labeled by additional downstream processes, such as payment type 108B, or provider classification 108C.

One or more statistical models 103 can be implemented in parallel with, or serially with machine learning classifier 102. Statistical models 103 can classify certain edge cases that may be difficult to detect for a machine learning classifier 102. For example, where transactions are labeled with obscure computer-generated names (e.g., a hash or other cryptic title such as "E 94th CONDOMINI COMM GRE 18523 PROCESS AB") the statistical model may be able to classify those transactions based on the amount relative to other amounts within the account and known reportable transactions in the geographic region of the transaction. In another example, when transactions have a common identifier that is used for many transactions, both reportable and not reportable (e.g., "Venmo" or "Paypal") the statistical model may be able to classify specifically whether the payment is a utility payment similarly to the transactions with cryptic titles, that is, by comparing the transaction amount, time, and similar transactions within the same geographic region.

Transaction database 106 can represent a single memory or multiple memories. The transaction database 106 can include any memory or database module and can take the form of volatile or non-volatile memory including, without limitation, magnetic media, optical media, random access memory (RAM), read-only memory (ROM), removable media, or any other suitable local or remote memory component. The transaction database 106 can store various objects or data, including financial data, user and/or account information, administrative settings, password information, caches, applications, backup data, repositories storing business and/or dynamic information, and any other appropriate information associated with the system 100, including any parameters, variables, algorithms, instructions, rules, constraints, or references thereto. Additionally, the transaction database 106 can store any other appropriate data, such as VPN applications, firmware logs and policies, firewall policies, a security or access log, print or other reporting files, as well as others. While illustrated within the system 100, transaction database 106 or any portion thereof, including some or all of the particular illustrated components, can be located remotely from the system 100. In some instances, as a cloud application or repository, or as a separate cloud application or repository, the system 100 itself is a cloud-based system. In some instances, some or all of transaction database 106 can be located in, associated with, or available through one or more other components or elements associated with system 100. In some implementations, transaction database 106 can include a large number of user transactions including credit, checking, savings, cryptographic, or other transactions. In some implementations, the transactions are anonymized or have personally identifiable information removed.

Verification system 110 can be a separate computing system accessed and operated by the verification team and managers 120. Verification system 110 can be used to perform manual reviews of classifications made by ML classifier 102, statistical models 103, or performance from software application 112. In some implementations, the verification system 110 can automatically select a subset or portion of classified transactions for manual review or re-evaluation and verification. In some implementations, verification system 110 includes its own classifier or rules-based classification system that can independently confirm or reject the classifications generated by machine learning classifier 102 or statistical models 103.

Figure 2:
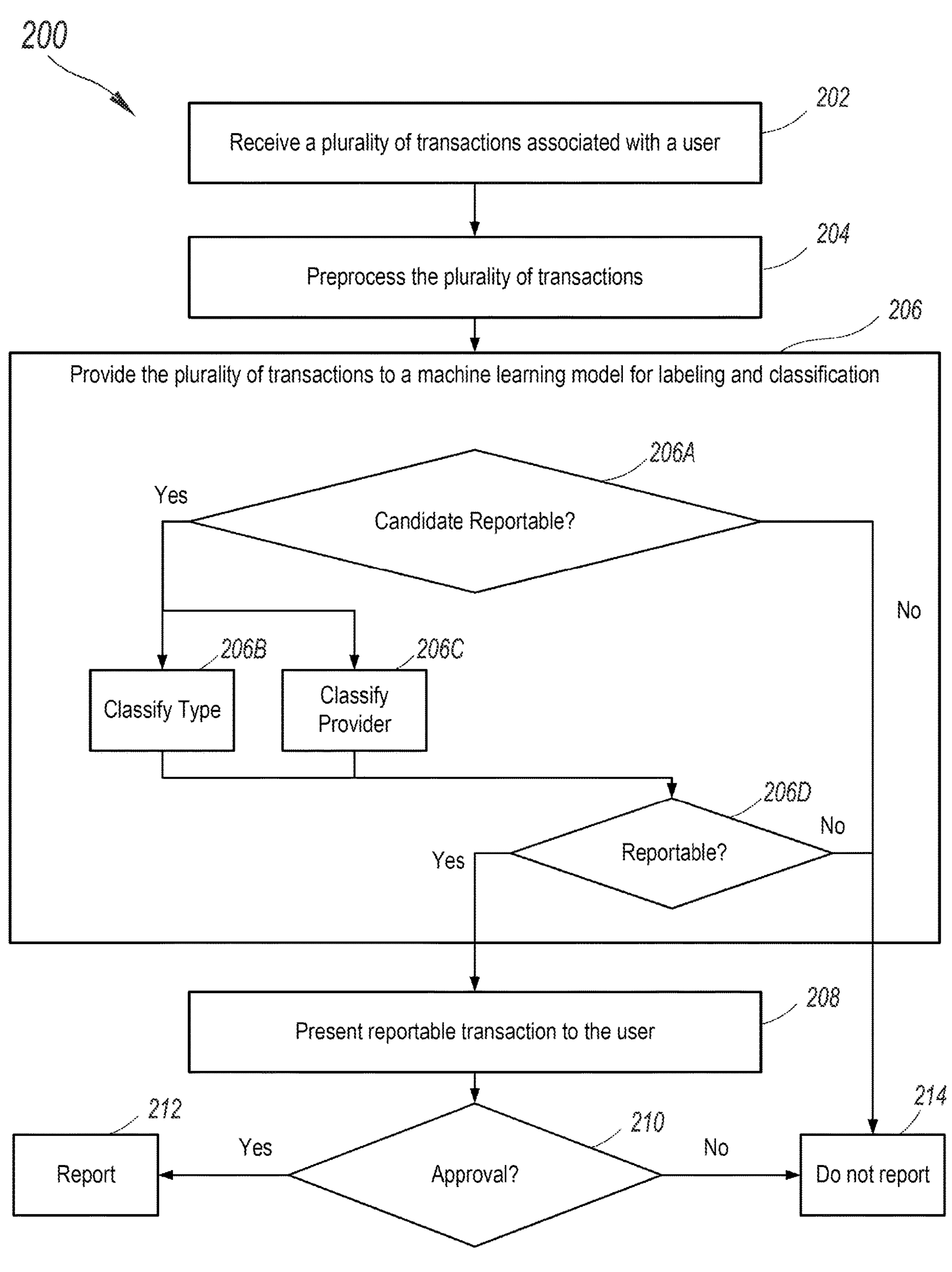
FIG. 2 is a block diagram illustrating an example process for classifying transactions using machine learning models.

FIG. 2 is a block diagram illustrating an example process 200 for classifying transactions using machine learning models. It should be understood that process 200 may be performed, for example, by system 100 of FIG. 1, or any other suitable system, environment, software, and hardware, or a combination of systems, environments, software, and hardware as appropriate. In some instances, method 300 may be performed by a plurality of connected components or systems. Any suitable system(s), architecture(s), or application(s) can be used to perform the illustrated operations.

At 202, the system receives a number of transactions from the user. In some implementations, the user approves and sends their transactions to the system for analysis. In some implementations, using a software application (e.g., software application 112 of FIG. 1). In some instances, after receiving consent of the user, their transactions are forwarded from one or more banking or financial institutions to the system. The transactions can include credit transactions, checking transactions, savings transactions, cryptographic transactions, or others. In some implementations, the transactions include metadata and additional information such as transaction time, location, and/or payment method etc. In some implementations, a portion of the received transactions are labeled or pre-classified. These labeled transactions can be provided by the user who manually labeled them, or can be included in metadata, or based on rules-based classification. An example of a rules-based classification can be a transaction for a large amount to a car dealership can be classified as "car payment" based on the recipient and the amount.

At 204, the received transactions are preprocessed. Preprocessing can include a variety of actions such as removing noise, standardizing/reformatting data, identifying and correcting incorrect or missing data, and generally putting the data in a form suitable for further analysis.

In some implementations, one form of preprocessing can include vectorization and/or embedding of the transactions. Vectorization of the transactions can include performing a clustering algorithm (e.g., K-means clustering, DBSCAN, or others) to generate an array of vectors, where each transaction is mapped to a vector representing that transaction. In some implementations, each vector is of a predetermined length and provides a numeric representation of the transaction that is more easily consumed by downstream processes such as statistical analysis or machine learning.

At 206, the vectorized transactions are provided to a machine learning model for classification. The machine learning model can include multiple different algorithms or models that can operate serially or in parallel. In the illustrated example, the transactions are provided to a first classifier which identifies each transaction as either a candidate reportable transaction or not (206A). If the transaction is not a candidate reportable transaction, process 200 proceeds directly from 206A to 214. If the transaction is a candidate reportable transaction, then the transaction can be provided simultaneously to a type of classification (206B) and a provider classification (206C). It should be noted that in some implementations type classification 206B and classify provider 206C occur sequentially, or asynchronously. Further, the term "simultaneously" should not be interpreted as requiring identical timing, but merely that no intentional delay is taken when process 200 proceeds from 206A to 206B and 206C. Type classifier 206B can use an Xgboost algorithm or other machine learning algorithm that reviews candidate reportable transactions and assigns a type of label based on the type of transaction. Some example labels may include, but are not limited to, electricity, rent, gas, water, cable/internet, mortgage payment, interest payment, cell phone bills, etc. Similarly, the provider classifier 206C can identify the provider of the service associated with the candidate reportable transaction. For example, the provider classifier 206C can identify a transaction provider as "Comcast" or "Pacific Gas & Electric" among others. In some implementations, provider classifier 206C adds its label in addition to the label provided by type classifier 206B. In some implementations, both classifiers 206B and 206C label every transaction independently.

At 206D, an overall classifier reviews the previously labeled transactions and determines whether the candidate transaction is reportable or not. In some implementations the overall classifier calculates a probability that a transaction is reportable (e.g., from 0.0-1.0) and determines that a transaction is reportable if it is over a predetermined threshold (e.g., 0.85, or 0.9 etc.). If the transaction is determined to be not reportable, process 200 proceeds to 214 and the transaction is not reported.

At 208, the reportable transaction(s) are presented to the user. In some implementations, they are sent to a user device (e.g., user's mobile phone), and presented in a GUI that enables the user to select and investigate each transaction. The GUI further provides the ability for the user to approve or disapprove of reporting each transaction. Generally, the GUI provides the user with an efficient and user-friendly presentation of data provided by or communicated within the system. The GUI can include multiple customizable frames or views having interactive fields, pull-down lists, and buttons operated by the user. In general, the GUI is often configurable, supports a combination of tables and graphs (bar, line, pie, status dials, etc.), and is able to build real-time portals, application windows, and presentations. Therefore, the GUI can be any suitable graphical user interface, such as a combination of a generic web browser, a web-enabled application, intelligent engine, and command line interface (CLI) that processes information in the platform and efficiently presents the results to the user visually.

In some implementations, presented with a list of reportable transactions is a predicted increase in the user's credit score associated with reporting the transactions. For example, a system (e.g., system 100 of FIG. 1) can identify a user's current credit score and based on the amount of reportable transactions and the history associated with them, can provide an estimate on how much it will increase, or what it will be if they report the recommended transactions. In some implementations, this predicted credit score increase is determined using a predictive machine learning model that uses past reporting as training data.

At 210, the user provides an input to the GUI to decide whether to report the identified transaction to the appropriate reporting agency. If the user denies or rejects approval, process 200 proceeds to 214 and the labeled transactions are not reported. If the user approves reporting, at 212 the selected transactions can be reported to the appropriate agencies. In some implementations, the transactions are reported automatically, with a backend system parsing the necessary transaction details based on the transaction information, its classification at 206, and sends an application or a report to the reporting agencies (e.g., via a network).

Figure 3:
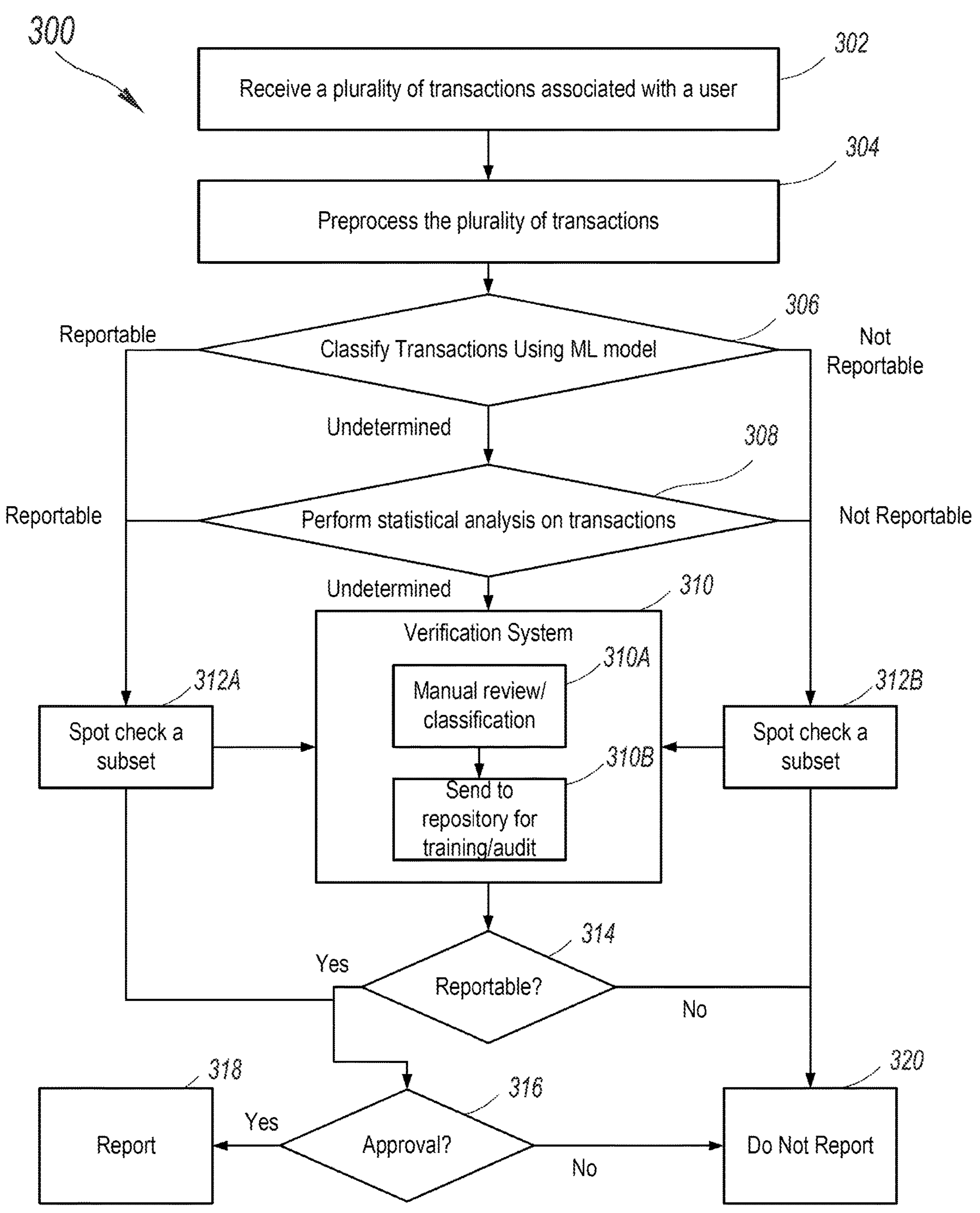
FIG. 3 is a block diagram illustrating an example process for classifying transactions with mixed methods.

FIG. 3 is a block diagram illustrating an example process 300 for classifying transactions with mixed methods. It should be understood that process 300 may be performed, for example, by system 100 of FIG. 1, or any other suitable system, environment, software, and hardware, or a combination of systems, environments, software, and hardware as appropriate. In some instances, method 300 may be performed by a plurality of connected components or systems. Any suitable system(s), architecture(s), or application(s) can be used to perform the illustrated operations.

At 302, the system receives a number of transactions from the user. In some implementations, the user approves and sends their transactions to the system for analysis. In some implementations, using a software application (e.g., software application 112 of FIG. 1). In some instances, after receiving consent of the user, their transactions are forwarded from one or more banking or financial institutions, to the system. The transactions can include credit transactions, checking transactions, savings transactions, cryptographic transactions, or others. In some implementations, the transactions include metadata and additional information such as transaction time, location, and/or payment method etc. In some implementations, a portion of the received transactions are labeled or pre-classified. These labeled transactions can be provided by the user who manually labeled them, or can be included in metadata, or based on rules-based classification. An example of a rules-based classification can be a transaction for a large amount to a car dealership can be classified as "car payment" based on the recipient and the amount.

At 304, the received transactions are preprocessed. Preprocessing can include a variety of actions such as removing noise, standardizing/reformatting data, identifying and correcting incorrect or missing data, and generally putting the data in a form suitable for further analysis.

In some implementations, one form of preprocessing can include vectorization and/or embedding of the transactions.

Vectorization of the transactions can include performing a clustering algorithm (e.g., K-means clustering, DBSCAN, or others) to generate an array of vectors, where each transaction is mapped to a vector representing that transaction. In some implementations, each vector is of a predetermined length and provides a numeric representation of the transaction that is more easily consumed by downstream processes such as statistical analysis or machine learning. In some implementations, a large initial vector is formed from the training data. That vector could be thousands or millions of columns for each unique word identified. Then every transaction's text will have a few words in common with the large vector created. For example, assuming one transaction's text states: Brand's coffee. If the general vector has 5000 parameters then the vector for the transaction will then have a one at two words: "Brand" and "coffee" and the rest will be zero. Such a vector might appear like [0, 0, . . . , 1, 0, . . . 1, 0, 0 . . . ].

At 306, the transactions are classified. In some implementations the classification uses a series of machine learning algorithms or neural networks similar to classifiers 206A-C discussed above with respect to FIG. 2. The machine learning classifier at 306 classifies each transaction into one of three categories. Either a transaction is reportable, not reportable, or undetermined. If a transaction is determined to be reportable by the machine learning models at 306, process 300 proceeds to 312A, where a subset of the classified transactions can be selected for a spot check. The transactions can be selected using random or pseudo random numbers, or based on transaction size, frequency, anomalous indications, or other parameters. Transactions selected for spot check at 312A are forwarded to the verification system at 310 which is discussed in further detail below. In some implementations, a preset percentage of all transactions are selected for spot check at 312A, and that preset percentage can be user adjustable by a system administrator.

Returning to 306, when a transaction is determined to be not reportable, process 300 proceeds to 312B, where similar to 312A, a subset of the transactions are selected to be spot checked. Process 300 then continues to 320 and the transactions are not reported.

If at 306, transactions are undetermined, or an uncertainty regarding the classification is above a predetermined threshold, process 300 can proceed to 308, where one or more statistical models are used to perform further analysis on transactions. The statistical models can identify and classify certain edge cases. In some implementations, the statistical model includes analyzing the account and comparing each transaction in that account with a distribution model of rent payments in the geographic region associated with the account (e.g., the zip code). For example, the statistical model can identify the account transaction that has a minimum error to the mean of the rent distribution for that region and ascertain that that transaction can likely be classified as rent. Similarly, the statistical model can review a distribution of payment date (e.g., day of month) for a given zip code or geographic region, and also determine a likelihood that a particular payment is rent or another reportable transaction (e.g., gas bill). In some implementations, additional correction factors can be used. For example, the rent transaction can be selected as the transaction in the account that has the least error to the mean of the distribution of rent transactions for that region, multiplied by the transaction amount.

Similar to the machine learning classifier at 306, the statistical models at 308 can provide three potential results, classifying transactions as reportable, not reportable, or undetermined. If a transaction is still undetermined it can be sent to a verification system at 310. The verification system can allow the verification team (e.g., verification team 120 of FIG. 1) to manually classify a transaction at 310A. In addition to classifying undetermined transactions, the verification system can review and confirm transactions that were selected for spot check at 312A and 312B. For example, the verification system can aggregate transactions requiring verification into bulk verification subsets. The verification system sends the bulk verification subsets to the verification team. The verification team provides the verification system with verification inputs indicating results of their verification. The verification inputs can include, for example, labels indicating a classification for each reviewed transaction, a label identifying the transaction as unverifiable, or one or more other appropriate labels. Once manual verification of a transaction has occurred, that transaction can be stored in a repository (310B) and used for future training of machine learning models and audits. For example, training data can be generated from the manually verified data by applying user created or selected labels to the data and storing the newly labeled data in a repository of training data.

At 314, after each transaction has been classified, if it is not reportable, process 300 proceeds to 320 and no report is made. Otherwise, the reportable transactions can be presented to the user for approval.

In some implementations, presented with a list of reportable transactions is a predicted increase in the user's credit score associated with reporting the transactions. For example, a system (e.g., system 100 of FIG. 1) can identify a user's current credit score and based on the amount of reportable transactions and the history associated with them, can provide an estimate on how much it will increase, or what it will be if they report the recommended transactions. In some implementations, this predicted credit score increase is determined using a predictive machine learning model that uses past reporting as training data.

At 316, the user provides an input to the GUI to decide whether to report the identified transaction to the appropriate reporting agency. If the user denies or rejects approval, process 300 proceeds to 320 and the labeled transactions are not reported. If the user approves reporting, at 318 the selected transactions can be reported to the appropriate agencies. In some implementations, the transactions are reported automatically, with a backend system parsing the necessary transaction details based on the transaction information and its classification and sends an application or a report to the reporting agencies (e.g., via a network).

Figure 4:
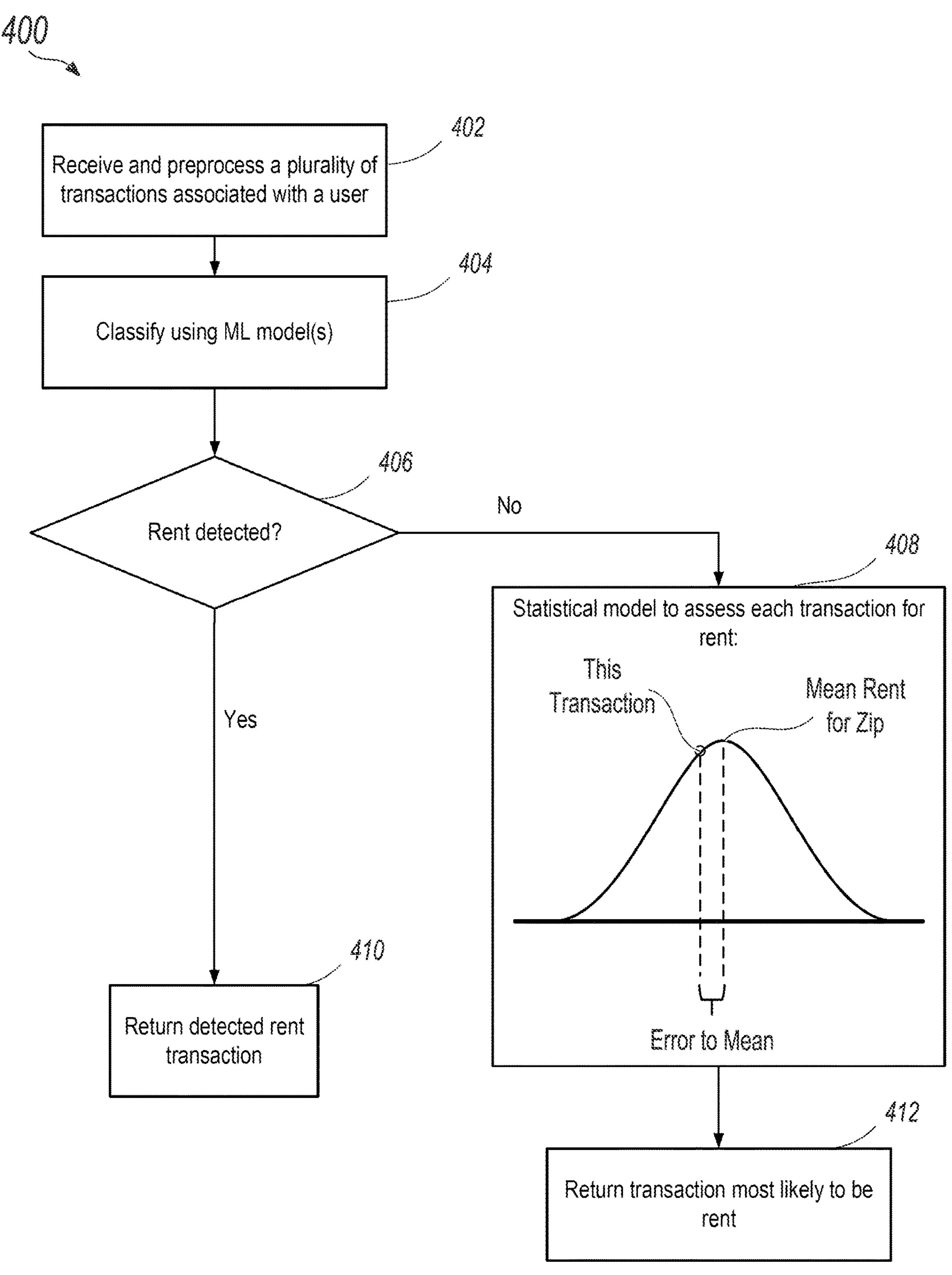
FIG. 4 is a flowchart illustrating an example use of statistical analysis in conjunction with machine learning to classify transactions.

FIG. 4 is a flowchart illustrating an example use of statistical analysis in conjunction with machine learning to classify transactions. It should be understood that process 400 may be performed, for example, by system 100 of FIG. 1, or any other suitable system, environment, software, and hardware, or a combination of systems, environments, software, and hardware as appropriate. In some instances, method 400 may be performed by a plurality of connected components or systems. Any suitable system(s), architecture (s), or application(s) can be used to perform the illustrated operations.

At 402, a plurality of transactions associated with a user are received and preprocessed. In some implementations, the user approves and sends their transactions to the system for analysis. In some implementations, using a software application (e.g., software application 112 of FIG. 1). In some instances, after receiving consent of the user, their transactions are forwarded from one or more banking or financial institutions, to the system. The transactions can include credit transactions, checking transactions, savings transactions, cryptographic transactions, or others. In some implementations, the transactions include metadata and additional information such as transaction time, location, and/or payment method etc. In some implementations, a portion of the received transactions are labeled or pre-classified. These labeled transactions can be provided by the user who manually labeled them, or can be included in metadata, or based on rules-based classification. An example of a rules-based classification can be a transaction for a large amount to a car dealership can be classified as "car payment" based on the recipient and the amount. The received transactions can be preprocessed including performing a variety of actions such as removing noise, standardizing/reformatting data, identifying and correcting incorrect or missing data, and generally putting the data in a form suitable for further analysis.

In some implementations, one form of preprocessing can include vectorization and/or embedding of the transactions. Vectorization of the transactions can include performing a clustering algorithm (e.g., K-means clustering, DBSCAN, or others) to generate an array of vectors, where each transaction is mapped to a vector representing that transaction. In some implementations, each vector is of a predetermined length and provides a numeric representation of the transaction that is more easily consumed by downstream processes such as statistical analysis or machine learning.

At 404, the transactions are classified using one or more machine learning models. In some implementations the classification uses a series of machine learning algorithms or neural networks similar to classifiers 206A-C discussed above with respect to FIG. 2.

At 406, once each transaction is classified, it is determined whether a rent transaction was detected. If a rent transaction was detected by the machine learning models at 404, process 400 proceeds to 410, where the rent transaction can be returned and labeled as reportable. If no rent transaction was detected, process 400 proceeds to 408.

At 408, a statistical analysis of the transactions is performed. Each transaction is compared to the historical rent payments for the region (or zip code) associated with the transaction. The statistical models can identify and classify certain edge cases. In some implementations, the statistical model includes analyzing the account and comparing each transaction in that account with a distribution model of rent payments in the geographic region associated with the account (e.g., the zip code). For example, the statistical model can identify the account transaction that has a minimum error to the mean of the rent distribution for that region and ascertain that that transaction can likely be classified as rent. Similarly, the statistical model can review a distribution of payment dates (e.g., day of month) for a given zip code or geographic region, and also determine a likelihood that a particular payment is rent. In some implementations, additional correction factors can be used. For example, the rent transaction can be selected as the transaction in the account that has the least error to the mean of the distribution of rent transactions for that region, multiplied by the transaction amount. Ultimately, each transaction is given a score representing its likelihood of being a rent transaction.

At 412, the statistical model returns the transaction that is assessed to be most likely to be a rent transaction. It should be noted that while process 400 is an example of analyzing a set of transactions to identify a rent transaction, process 400 can be used for other classifications. In general process 400 and the statistical models can perform well on any set of transactions that tend to cluster in one or more dimensions (e.g., price, payment date, location, name, etc.).

Figure 5:
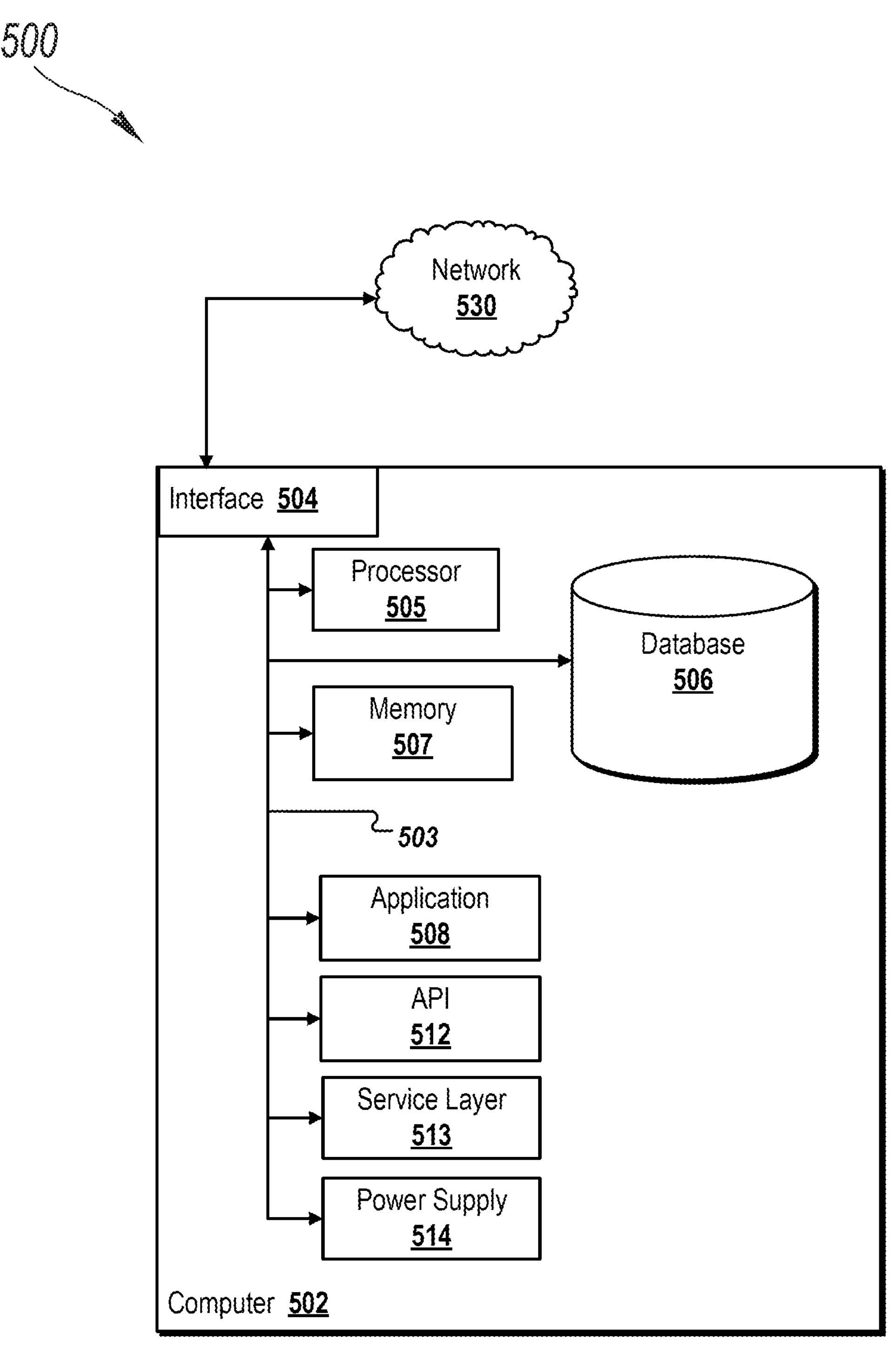
FIG. 5 is a block diagram illustrating an example of a computer-implemented system.

FIG. 5 is a block diagram illustrating an example of a computer-implemented system 500 used to provide computational functionalities associated with described algorithms, methods, functions, processes, flows, and procedures, according to an implementation of the present disclosure. In the illustrated implementation, system 500 includes a computer 502 and a network 530.

The illustrated computer 502 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the computer 502 can include an input device, such as a keypad, keyboard, or touch screen, or a combination of input devices that can accept user information, and an output device that conveys information associated with the operation of the computer 502, including digital data, visual, audio, another type of information, or a combination of types of information, on a graphical-type user interface (UI) (or GUI) or other UI.

The computer 502 can serve in a role in a distributed computing system as, for example, a client, network component, a server, or a database or another persistency, or a combination of roles for performing the subject matter described in the present disclosure. The illustrated computer 502 is communicably coupled with a network 530. In some implementations, one or more components of the computer 502 can be configured to operate within an environment, or a combination of environments, including cloud-computing, local, or global.

At a high level, the computer 502 is an electronic computing device operable to receive, transmit, process, store, or manage data and information associated with the described subject matter. According to some implementations, the computer 502 can also include or be communicably coupled with a server, such as an application server, e-mail server, web server, caching server, or streaming data server, or a combination of servers.

The computer 502 can receive requests over network 530 (for example, from a client software application executing on another computer 502) and respond to the received requests by processing the received requests using a software application or a combination of software applications. In addition, requests can also be sent to the computer 502 from internal users (for example, from a command console or by another internal access method), external or third-parties, or other entities, individuals, systems, or computers.

Each of the components of the computer 502 can communicate using a system bus 503. In some implementations, any or all of the components of the computer 502, including hardware, software, or a combination of hardware and software, can interface over the system bus 503 using an application programming interface (API) 512, a service layer 513, or a combination of the API 512 and service layer 513. The API 512 can include specifications for routines, data structures, and object classes. The API 512 can be either computer-language independent or dependent and refer to a complete interface, a single function, or even a set of APIs. The service layer 513 provides software services to the computer 502 or other components (whether illustrated or not) that are communicably coupled to the computer 502. The functionality of the computer 502 can be accessible for all service consumers using the service layer 513. Software services, such as those provided by the service layer 513, provide reusable, defined functionalities through a defined interface. For example, the interface can be software written in a computing language (for example, JAVA or C++) or a combination of computing languages and providing data in a particular format (for example, extensible markup language (XML)) or a combination of formats. While illustrated as an integrated component of the computer 502, alternative implementations can illustrate the API 512 or the service layer 513 as stand-alone components in relation to other components of the computer 502 or other components (whether illustrated or not) that are communicably coupled to the computer 502. Moreover, any or all parts of the API 512 or the service layer 513 can be implemented as a child or a sub-module of another software module, enterprise application, or hardware module without departing from the scope of the present disclosure.

The computer 502 includes an interface 504. Although illustrated as a single interface 504, two or more interfaces 504 can be used according to particular needs, desires, or particular implementations of the computer 502. The interface 504 is used by the computer 502 for communicating with another computing system (whether illustrated or not) that is communicatively linked to the network 530 in a distributed environment. Generally, the interface 504 is operable to communicate with the network 530 and includes logic encoded in software, hardware, or a combination of software and hardware. More specifically, the interface 504 can include software supporting one or more communication protocols associated with communications such that the network 530 or hardware of interface 504 is operable to communicate physical signals within and outside of the illustrated computer 502.

The computer 502 includes a processor 505. Although illustrated as a single processor 505, two or more processors 505 can be used according to particular needs, desires, or particular implementations of the computer 502. Generally, the processor 505 executes instructions and manipulates data to perform the operations of the computer 502 and any algorithms, methods, functions, processes, flows, and procedures as described in the present disclosure.

The computer 502 also includes a database 506 that can hold data for the computer 502, another component communicatively linked to the network 530 (whether illustrated or not), or a combination of the computer 502 and another component. For example, database 506 can be an in-memory or conventional database storing data consistent with the present disclosure. In some implementations, database 506 can be a combination of two or more different database types (for example, a hybrid in-memory and conventional database) according to particular needs, desires, or particular implementations of the computer 502 and the described functionality. Although illustrated as a single database 506, two or more databases of similar or differing types can be used according to particular needs, desires, or particular implementations of the computer 502 and the described functionality. While database 506 is illustrated as an integral component of the computer 502, in alternative implementations, database 506 can be external to the computer 502. The database 506 can hold any data type necessary for the described solution.

The computer 502 also includes a memory 507 that can hold data for the computer 502, another component or components communicatively linked to the network 530 (whether illustrated or not), or a combination of the computer 502 and another component. Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507, two or more memories 507 or similar or differing types can be used according to particular needs, desires, or particular implementations of the computer 502 and the described functionality. While memory 507 is illustrated as an integral component of the computer 502, in alternative implementations, memory 507 can be external to the computer 502.

The application 508 is an algorithmic software engine providing functionality according to particular needs, desires, or particular implementations of the computer 502, particularly with respect to functionality described in the present disclosure. For example, application 508 can serve as one or more components, modules, or applications. Further, although illustrated as a single application 508, the application 508 can be implemented as multiple applications 508 on the computer 502. In addition, although illustrated as integral to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion or management circuits (including recharging, standby, or another power management functionality). In some implementations, the power supply 514 can include a power plug to allow the computer 502 to be plugged into a wall socket or another power source to, for example, power the computer 502 or recharge a rechargeable battery.

There can be any number of computers 502 associated with, or external to, a computer system containing computer 502, each computer 502 communicating over network 530. Further, the term "client," "user," or other appropriate terminology can be used interchangeably, as appropriate, without departing from the scope of the present disclosure. Moreover, the present disclosure contemplates that many users can use one computer 502, or that one user can use multiple computers 502.

This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense and are instead taught merely to describe particularly representative examples of the present teachings.

Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This detailed description, therefore, is not to be taken in a limiting sense, and the scope of various embodiments is defined only by the appended claims, along with the full range of equivalents to which such claims are entitled.

The abstract of the disclosure is provided to allow the reader to quickly ascertain the nature of the technical disclosure. It is submitted with the understanding that it will not be used to interpret or limit the scope or meaning of the claims. In addition, in the foregoing detailed description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the detailed description, with each claim standing on its own as a separate embodiment.

The invention claimed is:

1. A method comprising:

training a machine learning model to identify one or more reportable transactions by using an optimizer to update layer weights of the machine learning model to produce a trained machine learning model wherein training the machine learning model comprises:

training a first machine learning sub-model to generate a subset of transactions that are classified as candidate reportable transactions;

training a second machine learning sub-model to classify each candidate reportable transaction as a particular transaction type;

training a third machine learning sub-model to identify a receiving party associated with at least one of the candidate reportable transactions; and training a fourth machine learning sub-model to determine whether each candidate reportable transaction is a reportable transaction based on outputs of the second and third machine learning sub-models;

receiving a plurality of transactions associated with a user;

vectorizing the plurality of transactions;

providing the vectorized plurality of transactions to the trained machine learning model to identify one or more reportable transactions that are reportable to one or more third party servers;

obtaining, as output of the machine learning model, a subset of the vectorized plurality of transactions as reportable transactions; generating a recommendation based on the reportable transactions;

providing data to a user device which when rendered by a user interface of the user device, will display the recommendation based on the reportable transactions; and in response to receiving an instruction from the user device, reporting a particular reportable transaction to a particular third-party server.

2. The method of claim 1, comprising:

selecting a subset of the reportable transactions;

sending the subset of the reportable transactions for verification to confirm classification outputs from at least one of the second, third, or fourth machine learning sub-models;

receiving one or more inputs indicating verification results associated with particular ones of the reportable transactions included within the subset;

updating the classification outputs based on the one or more inputs; and generating, from the one or more inputs, labeled data model training data.

3. The method of claim 1, wherein the first, second, third, and fourth machine learning sub-models comprise extreme gradient boosting (XGboost) models.

4. The method of claim 1, wherein the plurality of transactions comprise Automated Clearing House (ACH) transactions associated with a checking account of the user.

5. The method of claim 1 wherein, the reportable transactions are utility transactions.

6. The method of claim 1 wherein, the particular transaction type is one of a gas type, water type, electricity type, wireless type, or internet type.

7. The method of claim 1, wherein vectorizing the plurality of transactions comprises performing a bidirectional auto-regressive transformer (BART) tokenization and term frequency-inverse document frequency (TF-IDF) vectorization.

8. The method of claim 1, wherein generating the recommendation based on the reportable transactions comprises:

determining one or more of parameters indicating a reporting manner based on respective types and third-party server of the reportable transactions, wherein the one or more of parameters indicating a reporting manner comprise a reporting time or frequency; and generating the recommendation to include the one or more of parameters indicating the reporting manner.

9. The method of claim 1, wherein generating the recommendation based on the reportable transactions comprises:

providing the reportable transactions to a second machine learning model trained to predict a change in a credit score of the user based on the reportable transactions;

receiving, as output from the second machine learning model, a predicted change in the credit score of the user based on the reportable transactions; and determining whether to recommend the user to report the reportable transactions based on the predicted change in the credit score of the user; and generating the recommendation to include information of the predicted change in the credit score of the user.

10. A non-transitory computer readable medium storing one or more instructions executable by a computer system to perform operations comprising:

training a machine learning model to identify one or more reportable transactions by using an optimizer to update layer weights of the machine learning model to produce a trained machine learning model wherein training the machine learning model comprises:

training a first machine learning sub-model to generate a subset of transactions that are classified as candidate reportable transactions;

training a second machine learning sub-model to classify each candidate reportable transaction as a particular transaction type;

training a third machine learning sub-model to identify a receiving party associated with at least one of the candidate reportable transactions; and training a fourth machine learning sub-model to determine whether each candidate reportable transaction is a reportable transaction based on outputs of the second and third machine learning sub-models;

receiving a plurality of transactions associated with a user;

vectorizing the plurality of transactions;

providing the vectorized plurality of transactions to the trained machine learning model to identify one or more reportable transactions that are reportable to one or more third party servers;

obtaining, as output of the machine learning model, a subset of the vectorized plurality of transactions as reportable transactions;

generating a recommendation based on the reportable transactions;

providing data to a user device which when rendered by a user interface of the user device, will display the recommendation based on the reportable transactions; and in response to receiving an instruction from the user device, reporting a particular reportable transaction to a particular third-party server.

11. The medium of claim 10, comprising:

selecting a subset of the reportable transactions;

sending the subset of the reportable transactions for verification to confirm classification outputs from at least one of the second, third, or fourth machine learning sub-models;

receiving one or more inputs indicating verification results associated with particular ones of the reportable transactions included within the subset;

updating the classification outputs based on the one or more inputs; and generating, from the one or more inputs, labeled data model training data.

12. The medium of claim 10, wherein the first, second, third, and fourth machine learning sub-models comprise extreme gradient boosting (XGboost) models.

13. The medium of claim 10, wherein the plurality of transactions comprise Automated Clearing House (ACH) transactions associated with a checking account of the user.

14. The medium of claim 10, wherein the reportable transactions are utility transactions.

15. The medium of claim 10, wherein the particular transaction type is one of a gas type, water type, electricity type, wireless type, or internet type.

16. The medium of claim 10, wherein vectorizing the plurality of transactions comprises performing a bidirectional auto-regressive transformer (BART) tokenization and term frequency-inverse document frequency (TF-IDF) vectorization.

17. A computer-implemented system, comprising:

one or more processors; and one or more memory devices interoperably coupled with the one or more processors having tangible, non-transitory, machine readable media storing one or more instructions that, when executed by the one or more processors, perform operations comprising:

training a machine learning model to identify one or more reportable transactions by using an optimizer to update layer weights of the machine learning model to produce a trained machine learning model wherein training the machine learning model comprises:

training a first machine learning sub-model to generate a subset of transactions that are classified as candidate reportable transactions;

training a second machine learning sub-model to classify each candidate reportable transaction as a particular transaction type;

training a third machine learning sub-model to identify a receiving party associated with at least one of the candidate reportable transactions; and training a fourth machine learning sub-model to determine whether each candidate reportable transaction is a reportable transaction based on outputs of the second and third machine learning sub-models;

receiving a plurality of transactions associated with a user;

vectorizing the plurality of transactions;

providing the vectorized plurality of transactions to the trained machine learning model to identify one or more reportable transactions that are reportable to one or more third party servers;

obtaining, as output of the machine learning model, a subset of the vectorized plurality of transactions as reportable transactions;

generating a recommendation based on the reportable transactions;

providing data to a user device which when rendered by a user interface of the user device, will display the recommendation based on the reportable transactions; and in response to receiving an instruction from the user device, reporting a particular reportable transaction to a particular third-party server.

18. The method of claim 1, wherein the optimizer comprises at least one of: Adaptive Moment Estimation (ADAM), Adagrad, Adadelta, RMSprop, Stochastic Gradient Descent, or Stochastic Gradient Descent with momentum.

19. The medium of claim 10, wherein the optimizer comprises at least one of: Adaptive Moment Estimation (ADAM), Adagrad, Adadelta, RMSprop, Stochastic Gradient Descent, or Stochastic Gradient Descent with momentum.

20. The system of claim 17, wherein the optimizer comprises at least one of: Adaptive Moment Estimation (ADAM), Adagrad, Adadelta, RMSprop, Stochastic Gradient Descent, or Stochastic Gradient Descent with momentum.

* * * * *